(12) United States Patent
Suzuki (10) Patent No.: US 6,826,596 B1
(45) Date of Patent: Nov. 30, 2004

(54) SYSTEM FOR CATEGORIZING AND DISPLAYING REPLY MESSAGES IN COMPUTER FACILITATED DISCUSSIONS

(75) Inventor: Roy Satoshi Suzuki, 7864 Stanley Street, Burnaby, British Columbia (CA), V5E 1V8

(73) Assignee: Roy Satoshi Suzuki, Burnaby (CA)

( * ) Notice: Subject to any disclaimer, the term of this patent is extended or adjusted under 35 U.S.C. 154(b) by 0 days.

(21) Appl. No.: 09/391,187

(22) Filed: Sep. 7, 1999

(51) Int. Cl.⁷ .............................................. G06F 15/16
(52) U.S. Cl. ...................... 709/206; 709/203; 709/204; 709/205; 707/10; 707/500; 705/10; 705/14
(58) Field of Search ................................ 709/206, 204, 709/201, 205, 10; 707/10, 500, 7, 3; 345/758, 808, 751

(56) References Cited

U.S. PATENT DOCUMENTS

| | | | | |
|---|---|---|---|---|
| 5,715,466 A | * | 2/1998 | Flanagan et al. | 704/5 |
| 5,758,080 A | * | 5/1998 | Mortensen et al. | 709/204 |
| 5,793,365 A | * | 8/1998 | Tang et al. | 345/758 |
| 5,815,663 A | | 9/1998 | Uomini | |
| 5,819,269 A | * | 10/1998 | Uomini | 707/7 |
| 5,966,685 A | * | 10/1999 | Flanagan et al. | 704/8 |
| 6,026,429 A | * | 2/2000 | Jones et al. | 709/201 |
| 6,029,192 A | * | 2/2000 | Hill et al. | 707/500 |
| 6,101,532 A | * | 8/2000 | Horibe et al. | 709/206 |
| 6,253,234 B1 | * | 6/2001 | Hunt et al. | 707/10 |
| 6,275,811 B1 | * | 8/2001 | Ginn | 705/10 |
| 6,345,318 B1 | * | 2/2002 | Gamon | 345/808 |
| 6,347,332 B1 | * | 2/2002 | Malet et al. | 709/204 |
| 6,438,580 B1 | * | 8/2002 | Mears et al. | 709/204 |
| 6,515,681 B1 | * | 2/2003 | Knight | 345/751 |

FOREIGN PATENT DOCUMENTS

EP  0 718 784  12/1995

OTHER PUBLICATIONS

Willmott, Don. "The Joys of Viral Marketing." ZDNet.com. Jul. 21, 1999.*
Rafter, Michelle. "Livewire: New Web Tools Get Daily Tasks Done" Reuters, Jul. 21, 1999.*
Goodin, Dan. "Net Event–Planning to Party Like It's 1999" The Industry Standard. Oct. 25, 1999.*
Evite. com. www.evite.com/tour ; www.evite.com/compose ; www.evite.com/polling; Last Accessed Mar. 18, 2002.*

* cited by examiner

Primary Examiner—Hosain Alam
Assistant Examiner—Thu Ha Nguyen
(74) Attorney, Agent, or Firm—Oyen Wiggs Green & Mutala (57) ABSTRACT

A system for operating news groups or discussion groups requires a user who posts a message to specify two or more categories for reply messages. The system associates the categories with the message. The system requires a user who posts a reply to a message to categorize the reply into one of the categories. When the system displays a message thread the system displays messages in each category differently. In a preferred embodiment there are two categories and reply messages in a first one of the categories are displayed on a first side of a display and reply messages in a second one of the categories are displayed on a second side of the display. A user can see the general point of view of reply messages without reading the text of the reply messages. The system may be applied in a manner which permits users to see a graphical display which indicates which reply messages to a posting agree with the point of view expressed in the posting and which reply messages disagree with the expressed point of view.

11 Claims, 11 Drawing Sheets

REPLY MESSAGE

ON WHICH SIDE DO YOU WISH TO REPLY?

44 — ● FOR   ○ AGAINST

SUBJECT:

42

34 — TAXES SHOULD BE ELIMINATED - REPLY

DISCUSSION:

36

CATEGORIES FOR RESPONSES TO THIS REPLY:

38 — FOR AND AGAINST ▼

SUBMIT   CLEAR 32   40

FIG 3

| THREAD - FOOT IN THE CREASE? | ☒ |
|---|---|
| On November 2nd 1999 at 06:23am PST Roy wrote:<br>Subject: Foot in the Crease???<br>Discussion: Should Vancouver have won in overtime? | ▲ ▫ ▼ |

| To respond to this message click on the subject line and select the side you wish to respond on. To start your own discussion click here: NEW DISCUSSION ||
|---|---|
| YES - 2 REPLIES | NO - 2 REPLIES |
| On November 3rd 1999 at 04:23am PST Fred wrote:<br>Vancouver was robbed!... | |
| | On November 3rd 1999 at 04:33pm PST Janis wrote:<br>Vancouver couldn't scor... |
| | On November 3rd 1999 at 07:18pm PST Ted wrote:<br>I saw the replay and ther... |
| On November 4th 1999 at 02:17pm PST Jeph wrote:<br>The call made was totally ... | |

MORE   BACK   HOME

| indx | category | thread_id | subject | discussion | category#1_title | category#2_title | msg_stamp | author |
|---|---|---|---|---|---|---|---|---|
| 63 | #1 | 62 | Foot in the crease??? | Vancouver was robbed !!!. There was no way that goal didn't go in. | YES | NO | 19991103042304 | Fred |
| 64 | #2 | 62 | Foot in the crease??? | Vancouver couldn't score a goal if it tried. Vancouver would have lost anyway. | AGREE | DISAGREE | 19991103163311 | Janis |
| 65 | #2 | 62 | Foot in the crease??? | I saw the replay and there was a foot in the crease. | TAKE IT | LEAVE IT | 19991103191821 | Ted |
| 66 | #1 | 62 | Foot in the crease??? | The call made was totally unfair. The ref couldn't possibly have seen a foot in the crease from where he was standing. | YES | NO | 19991104141753 | Jeph |

SYSTEM FOR CATEGORIZING AND DISPLAYING REPLY MESSAGES IN COMPUTER FACILITATED DISCUSSIONS

TECHNICAL FIELD

This invention relates to computer discussion group and bulletin board, systems. Such systems permit users to post messages expressing points of view for viewing by others and to reply to messages posted by others. The invention has particular application to Internet or intranet news groups and discussion groups.

BACKGROUND

Computer discussion groups are well known. In such discussion groups a user can start a discussion by posting a message. The message may ask a question, express a point of view, or otherwise provide fruit for further discussion. Other users can post reply messages in reply to the message. A single message may provoke numerous reply messages. On the Internet, news groups are hosted on servers. Users run suitable client software, which may be called "news group reader" software on their computers. The client software facilitates reading the contents of news groups, posting reply messages to previously posted messages and posting messages to start new threads.

Existing news groups, discussion groups and bulletin boards have linear structures. A "thread" consists of a set of reply messages to the original message and a sequence of replies to the reply messages. Many types of news group reader software will sort messages in a news group into threads and will arrange links to the various messages so that a user can tell by viewing the links something about the sequence in which the messages were posted and which messages are replies to which other messages.

A disadvantage of existing news group reader software is that a user must view each message in a thread in order to understand the positions taken by the authors of the different messages.

The Internet has spawned a number of experiments in direct democracy. Various Internet web sites have been set up for the purpose of polling public opinion, whether on the subject of politics, consumer goods or other topics. Such sites typically provide users with the opportunity to select the one of two or more prepared statements which most closely matches the user's opinion on the topic at hand. A counter simply counts up the number of times each statement is selected. Such polls suffer from the disadvantages that the questions are pre-defined and users are forced to select one of several statements without having an opportunity to explain their positions.

A problem with Internet discussion groups is that users can post messages under pseudonyms. Therefore it is not always possible to know whether a point of view expressed in a posted message is reliable. Even worse, an Internet user can post messages which purport to be from someone else, for example a trusted public figure.

There is a need for a system which permits users of computer networks, whether those computer networks are global in nature or more localized, to better exchange ideas. There is a particular need for systems which permit users to know whether they can be confident that a posted message was really posted by the person listed as its author or whether the posted message is unverified, or even unverifiable, and could have been posted by anyone at all.

SUMMARY OF INVENTION

This invention provides systems for operating computer facilitated discussion groups which enable a user who posts a message to specify a group of two or more categories for sorting replies to the message. When a second user replies to a message then the second user chooses one category from the group of categories to be associated with the reply. When a user displays a message and a thread of replies to the message then the system can display the reply messages in a manner which visually distinguishes reply messages in one category from reply messages in other categories. This permits a user to understand the point of view from which a reply message is posted without needing to read the reply message itself. The system can also compute the number of reply messages associated with each category.

Preferred aspects of the invention associate verification information with each posted message. The verification information preferably specifies whether the message is unverifiable, verifiable or verified. A user can choose whether to view all messages, only verified and verifiable messages, or only verified messages. This permits the user to selectively view only messages for which the identity of the author is known, or can be discovered. Such messages are likely to be more reliable than messages posted by completely anonymous authors.

Further aspects and advantages of the invention are described below.

BRIEF DESCRIPTION OF DRAWINGS

In drawings which illustrate non-limiting embodiments of the invention.

DESCRIPTION

Figure 1A:
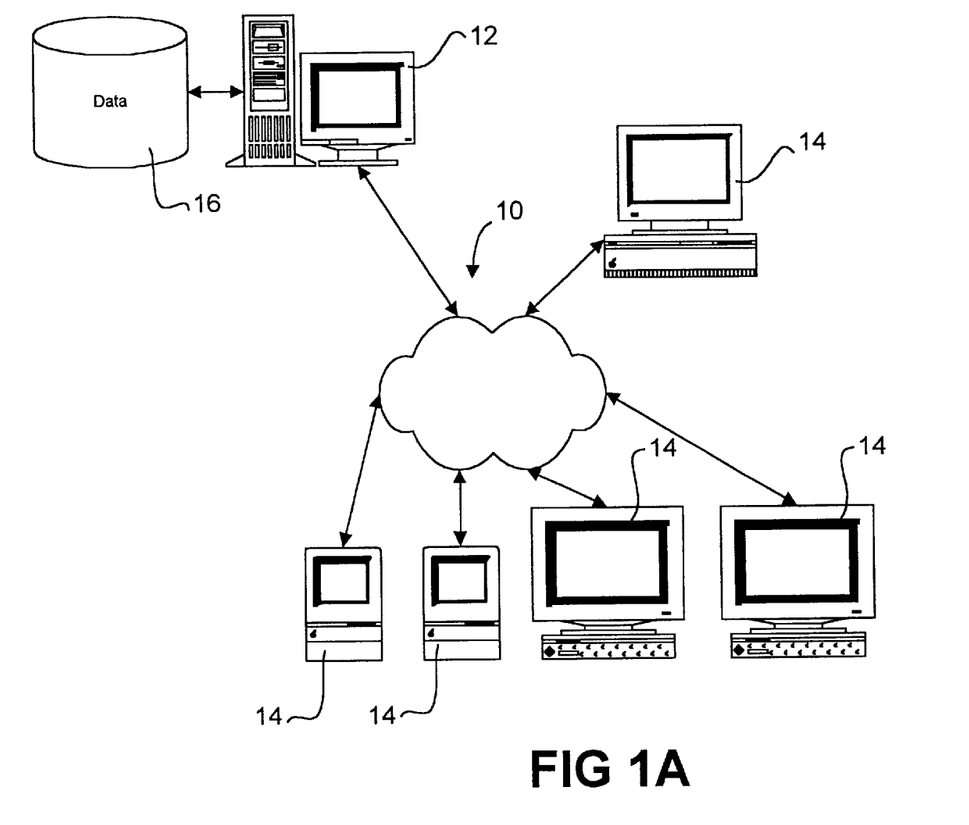
FIG. 1A is a schematic view of a computer network on which the invention may be practised.

FIG. 1 shows a computer network 10 which connects a server computer 12 to a plurality of user computers 14. Server computer 12 typically comprises a processing unit and a memory accessible to the processing unit. Network 10 may be a global computer network such as the Internet, a local area network, a wide area network, or any other network capable of carrying data between server 12 and user computers 14. Users of user computers 14 can forward messages to server 12. The messages are stored at server 12. Users of computers 14 can also view messages which have been previously posted on server 12 by themselves or others.

Figure 1B:
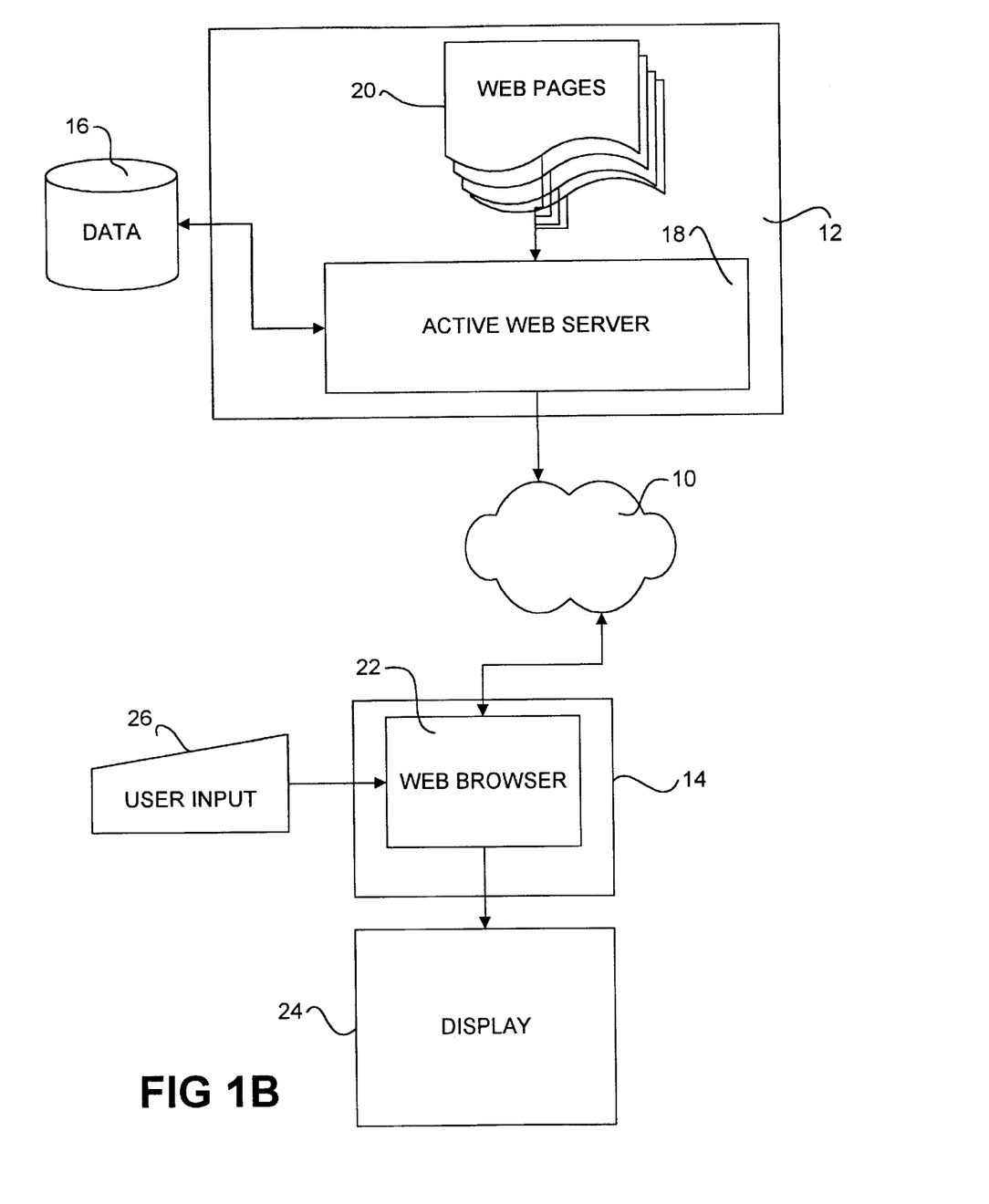
FIG. 1B is a schematic view illustrating software on server and user computers.

As shown in FIG. 1B, server 12 runs web server software and has access to a plurality of stored web page templates 20. User computers 14 run web browser software 22 capable of requesting web pages from server 12 and displaying images of the web pages on a display 24. Server 12 has access to a database 16 to which it can read or write information. When a user requests a web page from server 12, the active web server software loads an appropriate one of templates 20 and, if necessary, retrieves data from database 16 to complete a web page. Server 12 then sends the completed web page to the user's computer 14 via network 10. Web browser software 22 causes the web page to be displayed on display 24. The general operation of web servers and web browsers is well understood to those skilled in the art and will therefore not be described here in detail.

Figure 2:
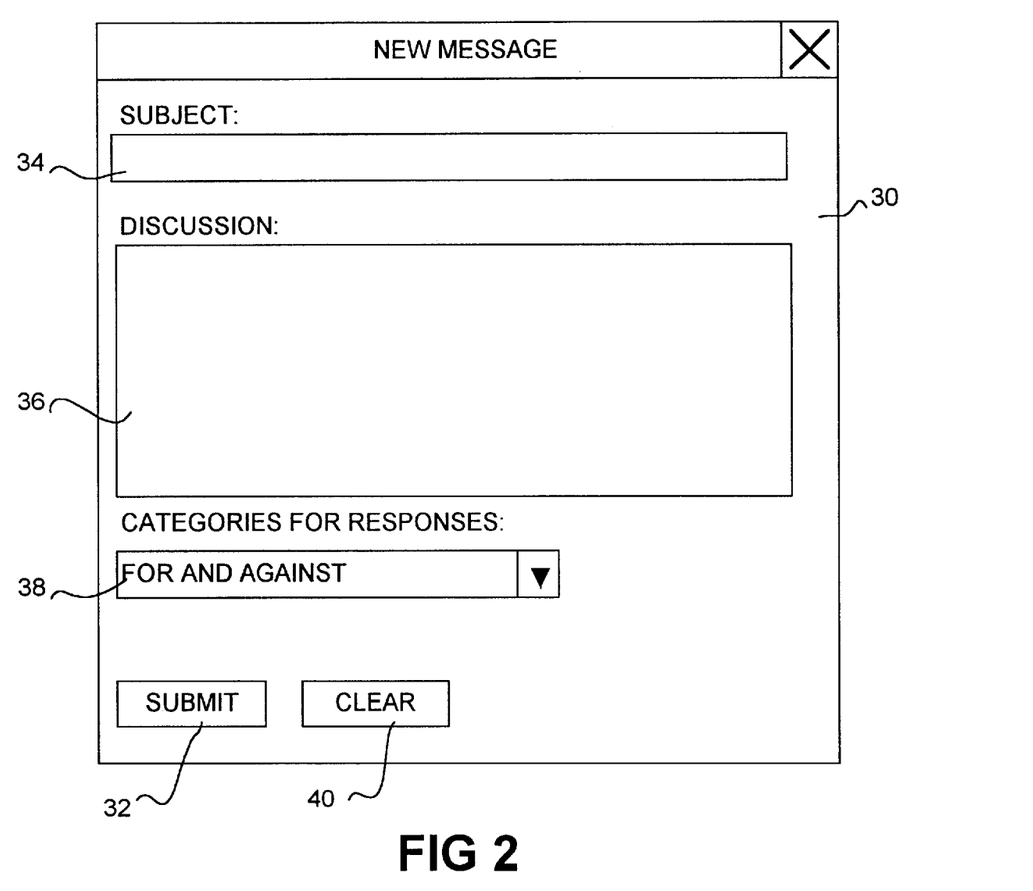
FIG. 2 illustrates schematically a web page comprising a form for posting new messages to a server according to the invention.

According to this invention, users of computers 14 can post messages to server 12. In the preferred embodiment, when a user wishes to post a message, the user causes web browser 22 to display a "new message" page from server 12. A sample new message page 30 is shown in FIG. 2. New message page 30 comprises a form into which a user can enter data via user interface 26. The user can then cause data entered into the form to be forwarded to server 12 on network 10 by activating a "submit" button 32.

Form 30 contains a field 34 into which a user can enter a subject for the message, a field 36 into which the user can enter text of the message, and a field 38 into which a user can specify response categories for the categorization of responses to the message. Form 30 also provides a "clear" button 40 for clearing any data entered into the fields of form 30.

Field 38 requires a person posting a new message to server 12 to specify a set of response categories into which responses to the message will be sorted. This distinguishes the system of this invention from previous systems which permit users to post messages to a server. In the example of FIG. 2, the user is required to specify a pair of response categories. The invention could, however, be practised with three or more different categories for responses. Form 30 may provide predefined descriptive titles for the categories. In addition to or instead of providing predefined category titles users may be permitted to specify their own category titles. Some examples of possible category titles where there are two categories are: FOR/AGAINST; YES/NO; TRUE/FALSE; AGREE/DISAGREE, and so on. Some examples of possible category titles where there are three categories are: YES/MAYBE/NO; AGREE/DON'T KNOW/DISAGREE; WORSE/THE SAME/BETTER, and so on. A person posting a new message may be provided with the opportunity to specify both the number of categories into which reply messages will be sorted as well as descriptive titles for each category.

When server 12 receives data from form 30 then server 12 stores the data in database 16. After one or more messages have been posted to server 12 then the message, or messages may be viewed. A user can view previously posted messages by navigating to a web page hosted by server 12 which displays a list of messages available for viewing. Server 12 prepares the web page by querying database 16 for a list of available messages and adding the list of available messages to a template 20. Server 12 then sends the web page to the user's computer 14 on network 10.

Figure 3:
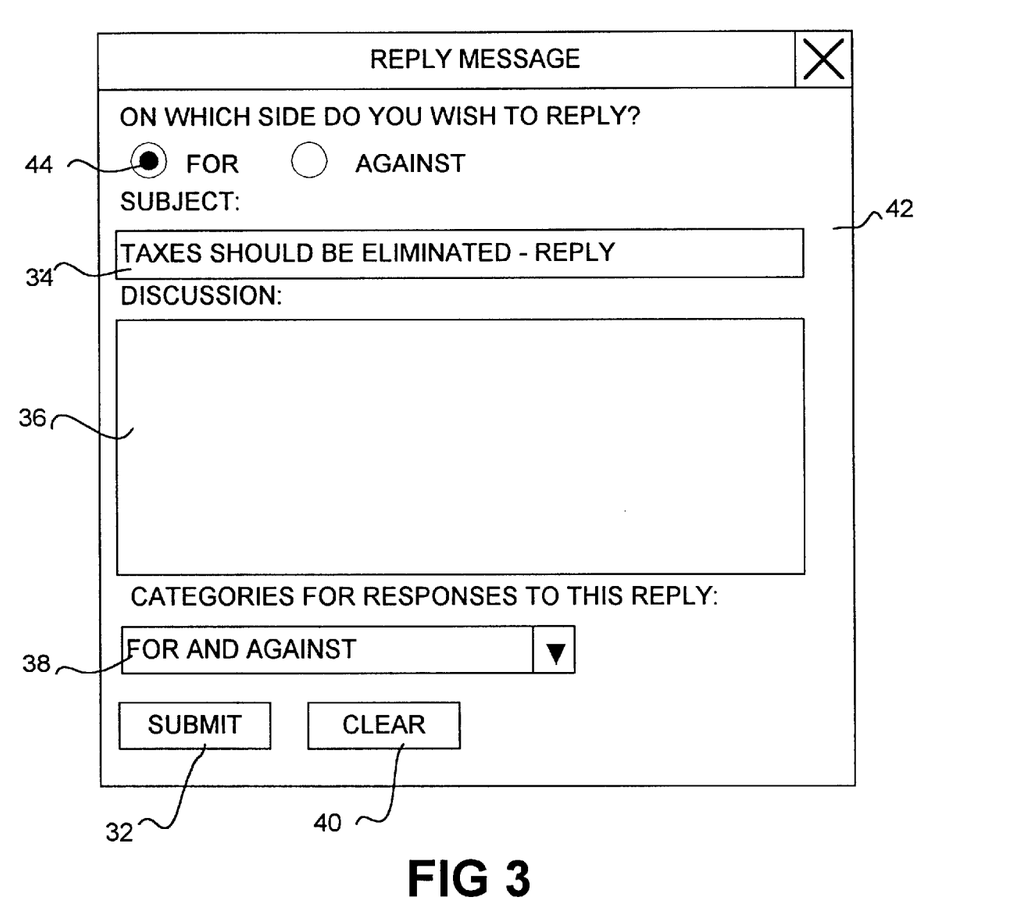
FIG. 3 illustrates schematically a web page comprising a form for posting a reply to a previously posted message to a server.

A user can signal an intention to reply to a message by, for example, selecting the subject line of the message to which the user wishes to respond with input device 26. In response to the receipt of a signal indicating that a user wishes to reply to a message, server 12 supplies a form which requires the user to specify which one of the categories associated with the message the reply should be associated with. FIG. 3 shows an example of a form 42 which may be generated by server 12 and forwarded to a user's computer 14 for the purpose of receiving a reply to a previously posted message. Form 42 is similar to form 30 with the addition of a section 44 which requires the user to select one of the response categories specified by the originator of the message being replied to. In the example of FIG. 3, section 44 comprises two radio buttons, one located next to the descriptive title for each of the two possible reply categories. Section 44 could be implemented in numerous different ways. Instead of providing a single form 42 for reply messages, server 12 could first supply separate forms for requiring a user to specify a category for a reply and for providing the reply itself. What is necessary is that a user be prompted to specify one of a group of two or more categories associated with a message when replying to that message.

After a message has received one or more replies then a user 14 may view a display which shows a representation of each reply and indicates visually which of the categories each reply is associated with. Server 12 may generate such a display in the form of a web page which is delivered to a computer 14 on network 10. This may be done by querying database 16 for all replies to a message and then inserting the result returned by database 16 into a template 20.

Figure 4:
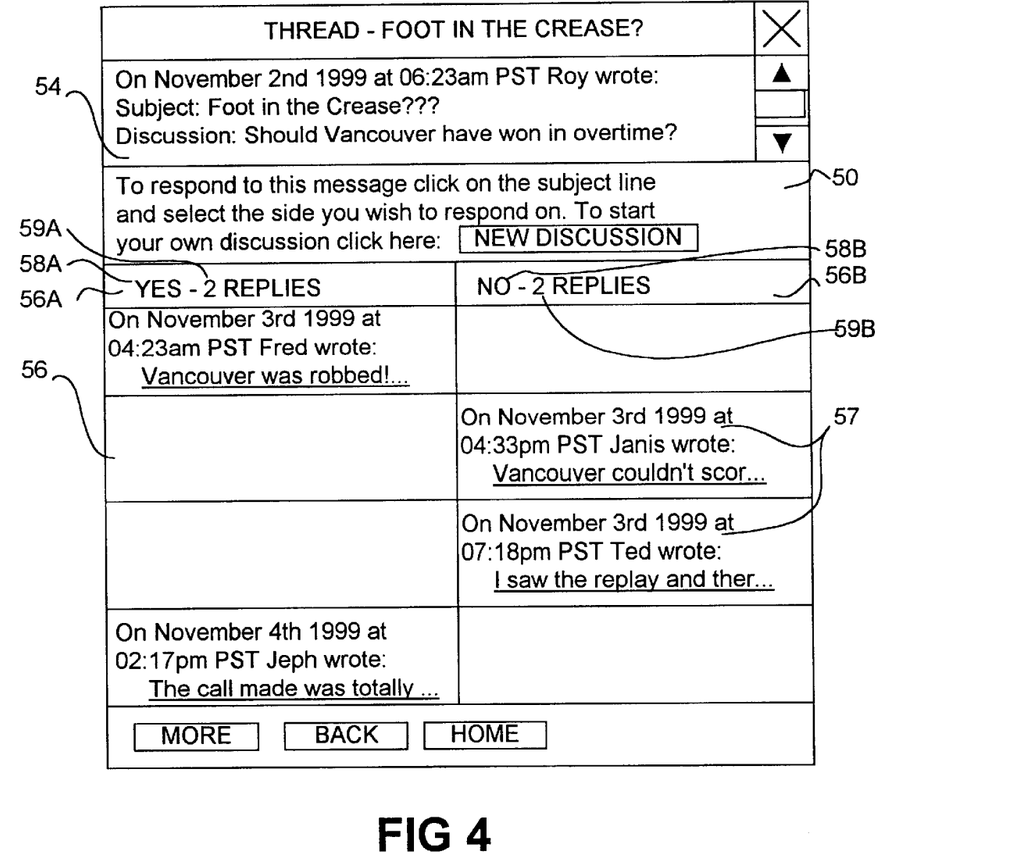
FIG. 4 illustrates schematically a web page for displaying a thread.

FIG. 4 shows one possible example of a web page 50 displaying a representation of a message 54 and representations 57 of replies to the message. In the example web page 50 of FIG. 4, the original message 54 is displayed at the top of page 50 and representations 57 of replies to message 54 are displayed in a lower section 56 of page 50. The representations 57 of replies to message 50 may be the reply messages themselves, the time and first few words of each reply message, as shown in FIG. 4, graphic icons representing the reply messages, or some other displayable representation of replies to message 54.

Section 56 is divided into two columns 56A and 56B. Column 56A contains representations of reply messages associated with the category having the descriptive title "YES". Column 56B contains representations of reply messages associated with the category having the descriptive title "NO". The descriptive titles for the categories associated with reply messages of each column are displayed at locations 58A and 58B respectively.

A user viewing page 50 can immediately ascertain which reply messages are associated with which point of view. The user may view any one of the reply messages in its entirety by selecting the underlined hyperlink which comprises part of each representation 57. The user may choose to read only reply messages which are categorized in a way which agrees with the user's point of view. If the user so chooses, the user may opt to read only reply messages which are categorized in a way which challenges the user's point of view. Server 12 can easily collect statistical information regarding the number of users on one side or another side of an issue. The number of reply messages 59A, and 59B in each category may be displayed at the head of each of columns 56A and 56B.

There are alternative ways to achieve a display having the general appearance of page 50 any of which may be used in the invention. For example, section 56 may comprise two frames located side-by-side, each displaying representations of reply messages associated with a particular category. Other formats of display may also be used to practice the invention. For example, instead of being located in different portions of a display, representations of reply messages associated with different categories could be colored or given different appearances to indicate which category they are associated with.

In the alternative to server 12 formatting a web page containing representations of replies to a message, server 12 could send to user computer 14 a set of records describing each of the reply messages in a thread and specifying the category associated with each reply message. In place of, or in addition to web browser software, user computers 14 could run software which receives such records and prepares and formats a display which shows representations of each reply displayed in such a way that reply messages in each category in the group of categories associated with the message being replied to are visually distinguished from one another.

Figure 5:
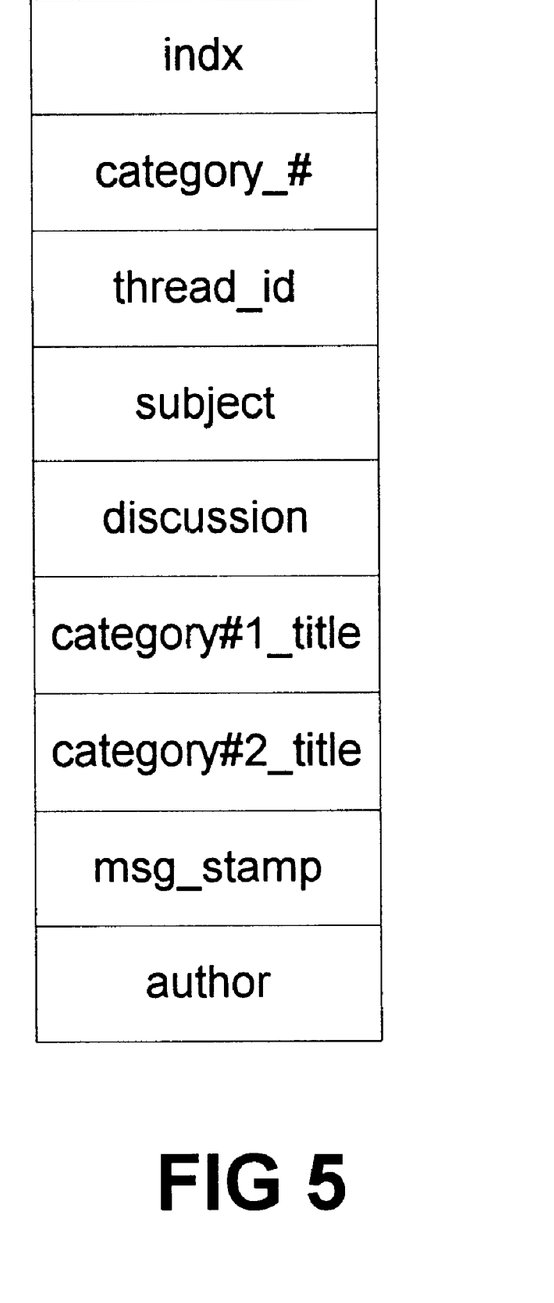
FIG. 5 illustrates a possible format for records of messages in a database for use in a system according to the invention.

Database 16 may be replaced with any sort of memory of storage device into which server 12 can store and retrieve data. Database 16 is not limited to traditional "database" software. Database 16 is preferably a relational database. FIG. 5 shows a possible structure for records of messages in database 16. The indx field contains a unique number which identifies each message. The thread_id field holds a NULL value in messages which do not reply to any other message. In the records for messages which reply to a previous message the thread_id field holds the value of the indx field for the previous message being replied to. Also, in the records for messages which reply to a previous message the category_# field identifies one category (as specified in the record for the message being replied to) with which the message is associated. The subject field contains the text of the subject of the message. The discussion field contains the text of the discussion. The fields category#1_title, category#2_title contain descriptive titles for the categories into which replies to the message must be categorized. If more than two categories are permitted then there will be additional fields specifying descriptive titles for the additional categories and, where convenient, a field specifying the number of categories. The msg_stamp field contains a time and date stamp for the message. The author field contains the name of the message's author.

Figure 10:
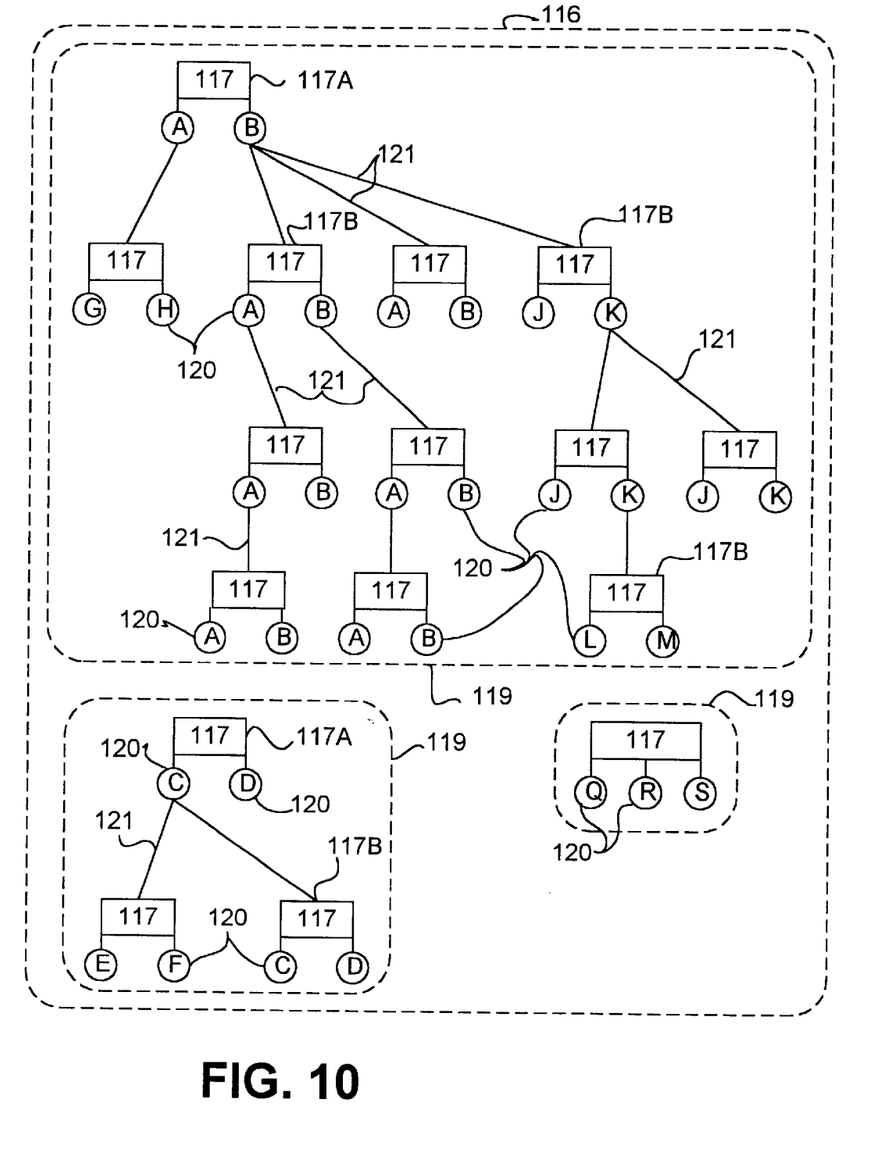

It can be appreciated that as the invention is used, database 16 will come to contain a data structure in which records for individual messages are linked to one another in a manner which indicates both which messages are included in a thread and the stance being taken in replies to an original posting. FIG. 10 shows an example of a data structure 116. Data structure 116 contains records 117 in three threads 119. Each thread 119 consists of a record 117A for an originating message which replies to no other message, and zero or more records 117B for replies to either the originating message or to replies to the originating message. Records 117A may be called "originating records". Records 117B may be called reply records. Each record 117 specifies two or more categories 120 into which replies to the corresponding message must be classified. Each reply record 117B includes pointers 121 which identify both the message 117 being replied to and a category with which the reply record is associated. Data structure 116 is useful because it facilitates the automatic extraction of useful data from data structure 116 in a manner that would not be possible with conventional newsgroups or the like.

Figure 6:
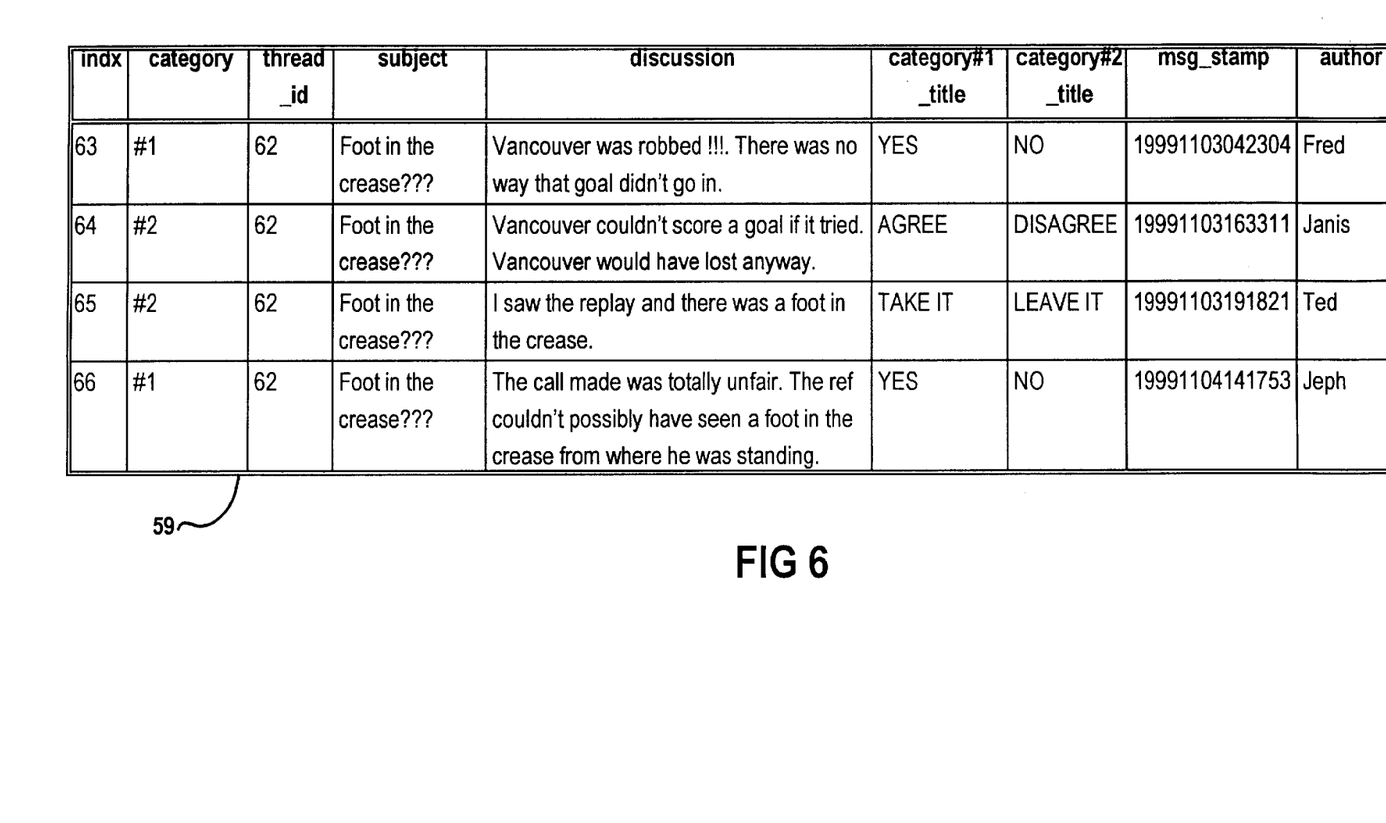
FIG. 6 is an example of a possible table returned by a query of a database.

When server 12 receives a signal which indicates that a user wishes to display a thread, for example, as shown in FIG. 4, then server 12 queries database 16 to retrieve the original message (using the value of the indx field for the original message) and to retrieve a table containing all other messages for which the thread_id field has the same value as the indx field of the original message. An example of a table 59 which might be returned by such a query is shown in FIG. 6.

Server 12 retrieves the messages in table 59 one at a time depending upon the value in the category field server 12 places a representation of each message either in left hand column 56A of page 50 or in right hand column 56B of page 50.

Figure 7:
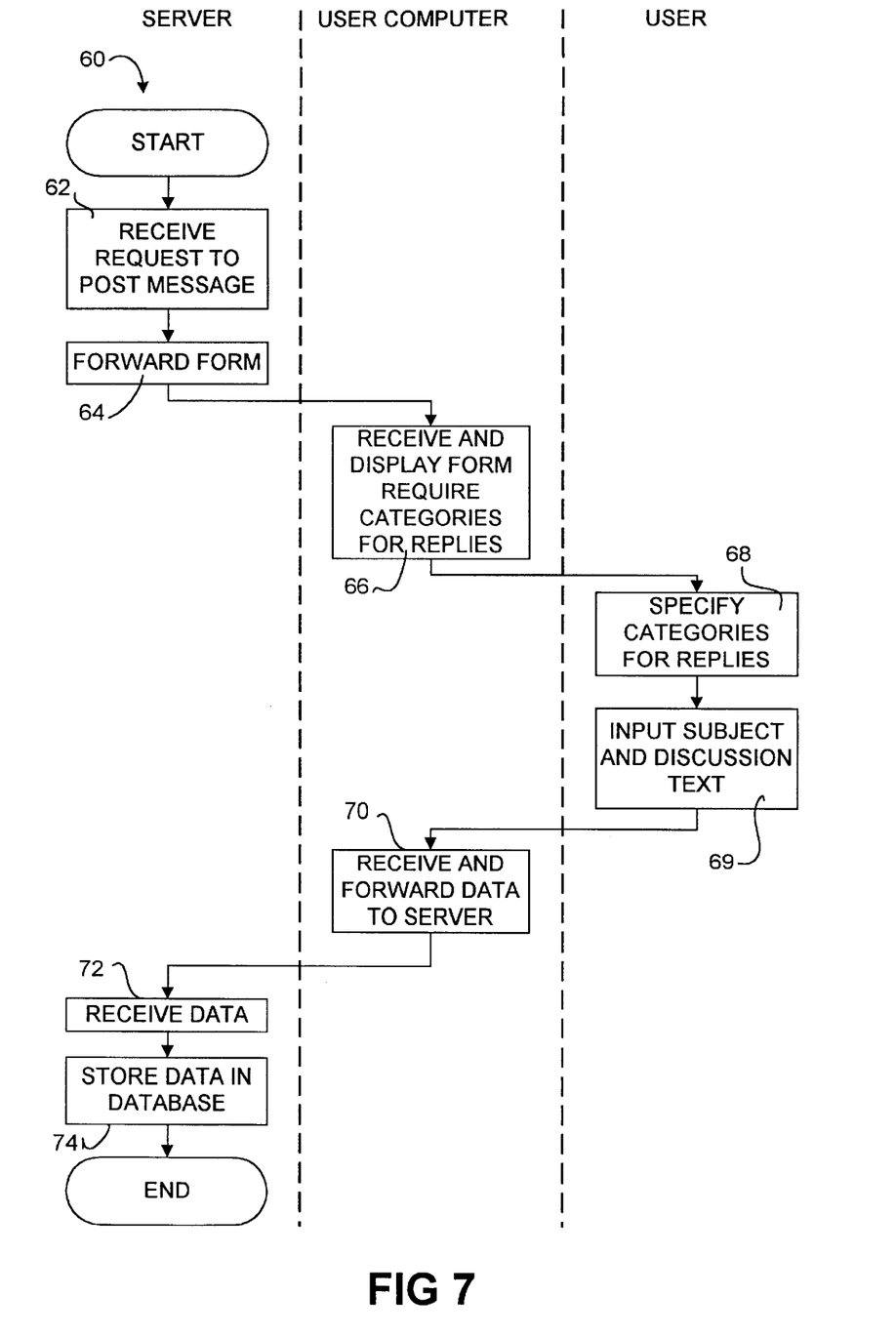
FIG. 7 is a flowchart illustrating a method for posting messages at a server according to the invention.

FIG. 7 is a flow chart illustrating a method 60 for receiving and posting messages on a server according to the invention. At step 62 server 12 receives a signal containing a request by a user to post a new message. Such a signal may be generated at a user computer 14 when a user activates a "new message" button on a web page generated by server 12. At step 64 server 12 prepares and forwards to the user computer 14 a form 30. At step 66 user computer 14 receives and displays the form 30 on display 24. As noted above, form 30 requires a user to specify categories into which replies to the message will be sorted. At steps 68 and 69, which may be completed in any order, the user specifies categories for replies to the message and inputs a subject and text for the message. In the example given above this is done by filling in form 30. At step 70 user computer 14 forwards the data input into form 30 to server 12 on network 10. At step 72 the data is received at server 12. At step 74 the data, including the response categories is saved by server 12 in database 16.

Figure 8:
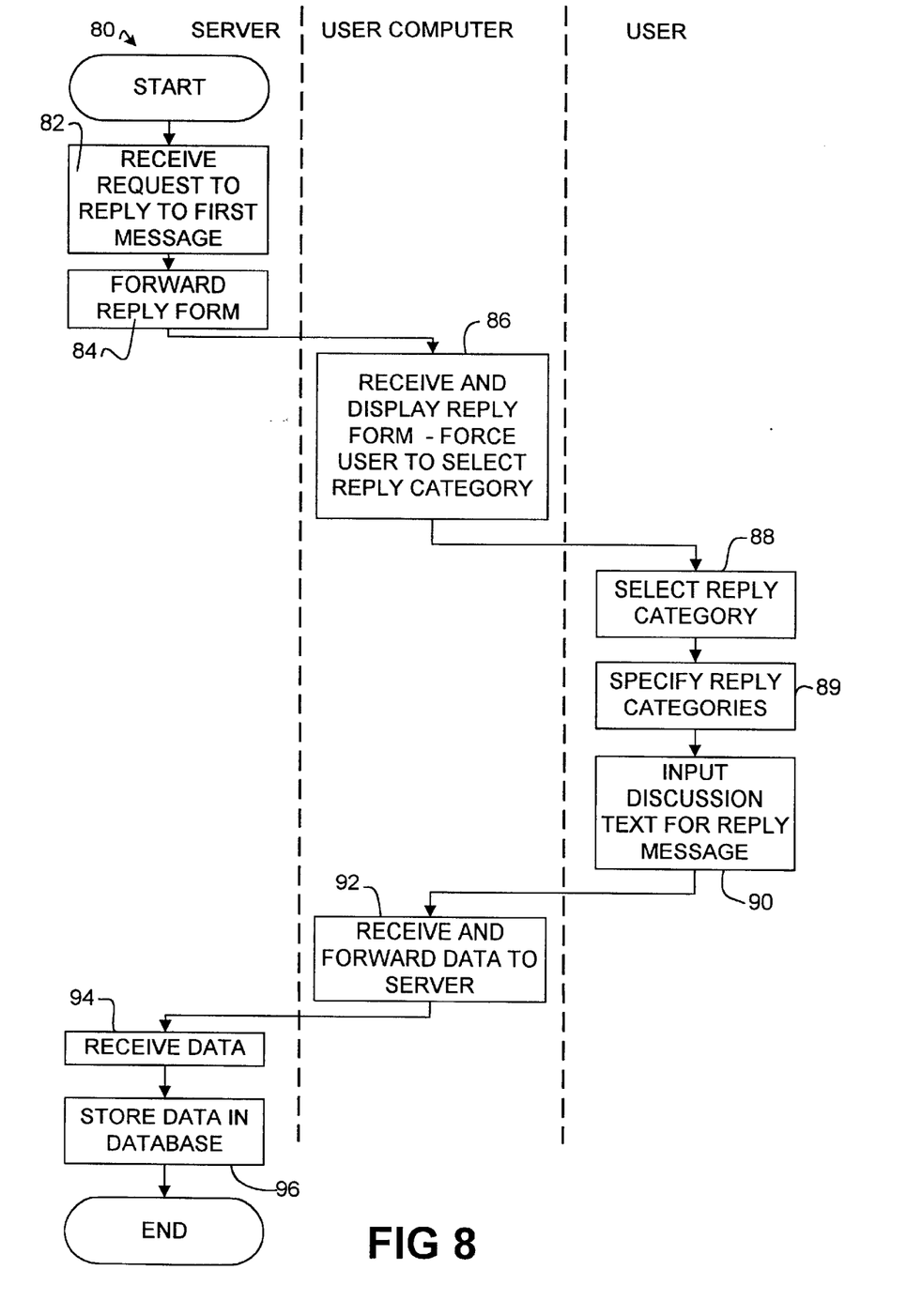
FIG. 8 is a flowchart illustrating a method for posting replies to messages at a server according to the invention.

FIG. 8 illustrates a method 80 for posting reply messages to a previously posted message. At 82 server 12 receives a request from a user computer 14 indicating that a user wishes to post a reply to a message. Such a signal may be generated at a user computer 14 when a user activates a "reply" button on a web page generated by server 12 or activates a hot spot connected to a reply function. At 84 server 12 prepares a reply form. To do this, server 12 retrieves from database 16 the descriptive titles for each category in the group of categories associated with the message being replied to. At step 86 user computer 14 receives and displays the form, for example, form 42. The form forces the user to select one category from the group of categories into which the reply will be categorized. Steps 88, 89 and 90 may be completed in any order these steps may be completed, for example, by allowing a user to complete a form 42 using an input device 26. At step 92 user computer 14 forwards data from the completed form 42 to server 12 over network 10. At step 96 server 12 stores a record of the reply in database 16.

Figure 9:
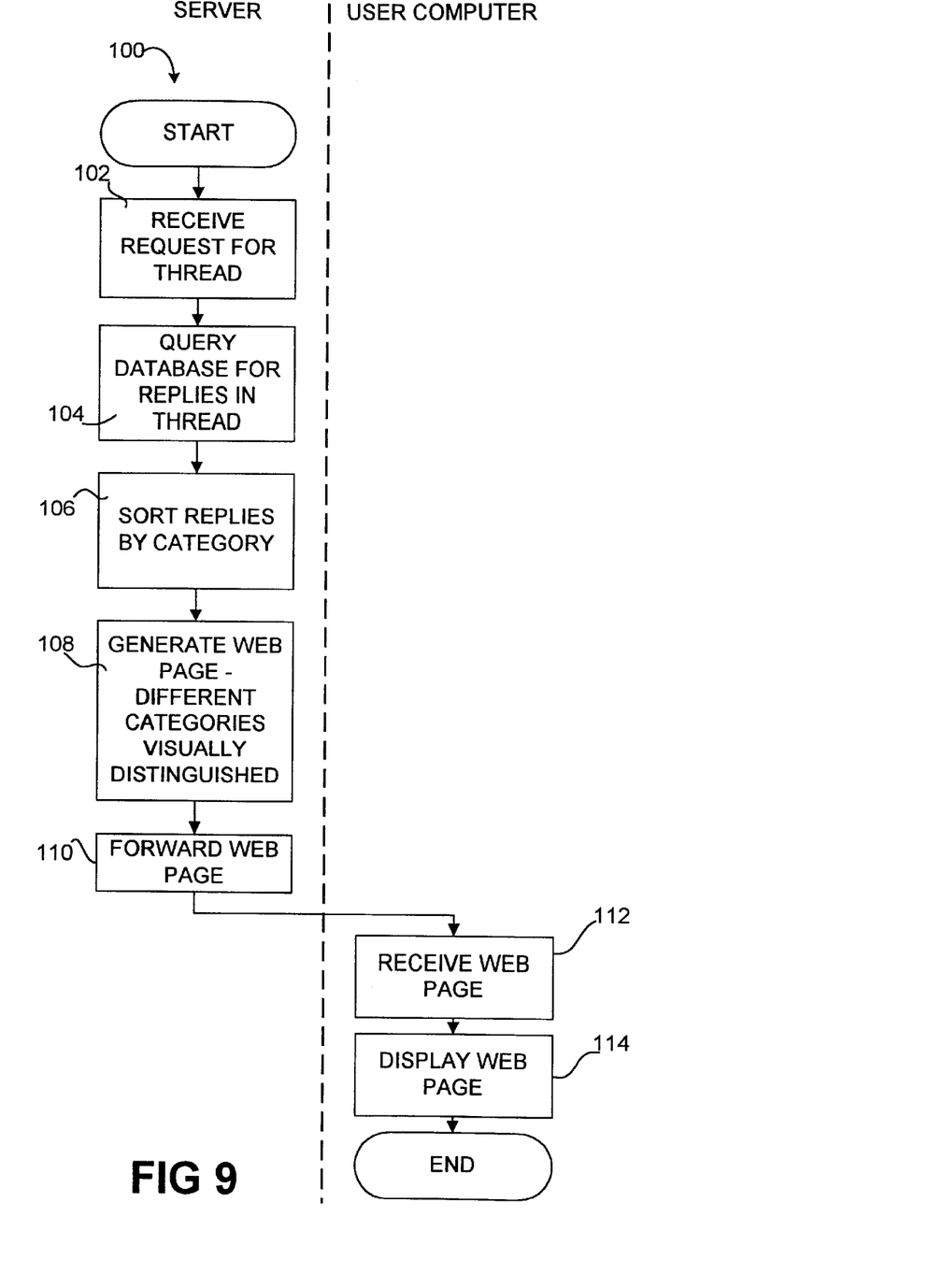
FIG. 9 is a flowchart illustrating a method for displaying a thread of replies to a message according to the invention; and, FIG. 10 illustrates a data structure according to the invention.

FIG. 9 is a flowchart which illustrates a method 100 for displaying a thread according to the invention. When server 12 receives a signal indicating that a user wishes to see a display of a thread (step 102) then server 12 queries database 16 for reply messages belonging to the thread at step 104. At step 106 server 12 sorts the reply messages by category. At step 108 server 12 assembles a web page from a template 20 and the sorted reply messages. On the web page, reply messages which are in different categories are visually distinguished from one another. This may be done, for example, by displaying representations of reply messages which are associated with different categories in physically separate parts of the web page, using a different icon to represent reply messages in different categories, providing a different color attribute for representations of reply messages in different categories. It is preferred to display representations of the reply messages in physically separated parts of the web page image. At step 110 server 12 sends the web page to user computer 14 on network 10. User computer 14 receives the web page at step 112 and displays the web page on display 24 at step 112.

The methods, systems and data structures of the invention may be enhanced by providing verification functions which allow users to assess the credibility of posted messages. Internet users can post messages anonymously or under pseudonyms. In a preferred embodiment of the invention, each message in database 16 includes information specifying whether or not the message is "verifiable". Most preferably, database 16 categorizes each message as being one of "unverifiable", "verifiable" and "verified". Unverifiable messages are messages posted anonymously. It is not readily possible to determine who is the author of an unverifiable message or, if the person posting the message has provided a name, whether that name is the person's real name. Verifiable messages are messages for which the user posting the message has provided sufficient information about themselves that the true name of the user posting the message could be ascertained and the user posting the message could be contacted to verify the accuracy of the posted message. A verified message is a message for which the true name of the user posting the message has been ascertained and the accuracy of the contents of the message has been verified.

Verification may be conducted automatically by server 12 by sending an e-mail message to a known e-mail address for a particular user and receiving a reply to the e-mail message. For example, consider the case where a message purporting to be from the president of the United States has been posted to server 12. Server 12 could automatically generate an e-mail to the known e-mail address for the president, president@whitehouse.gov seeking confirmation that the president was, in fact, the originator of the posted message. The Server 12 could mark the message as being "verified" upon receiving such a validation. Verification could also be done manually. Once a message has been verified, users of server 12 can see that the message has been verified and can trust that the message was posted by someone known to the operators of server 12 and, if the name of an author is given, that the named author is responsible for the content of the posted message.

In a preferred embodiment of the invention, users who wish to view the messages posted on server 12 can specify whether they wish to see all posted messages, only messages which are either verifiable or verified, or only verified messages. If the user signals to server 12 that the user wishes to view all posted messages, or both verifiable and verified messages then preferably each message displayed on a page 50 or other display, are somehow marked to indicate whether the message is unverifiable, verifiable or verified. For example, different colors may be used to display a representation of each of these types of message or a small icon could be presented as part of the representation of each message, the icon indicating the verification status of the message.

A field indicating whether or not each message in a database of posted messages can be, or is, verified could be provided and used in conjunction with any database of posted messages. The application of this inventive feature is not limited to methods and systems which provide multiple categories for reply messages as described above.

It can be appreciated that by including in database 16 verification information specifying whether each message is unverified, verified or verifiable, a user reading messages from database 16 can determine how much trust to place in each message.

Preferably users who post messages to server 12 may select whether or not to allow their names to be made public as the authors of messages by sending a signal to server 12. If the signal indicates that the name of the author of a message should be made public then the author's name is forwarded on the communication network together with the message to other users who wish to view the message. In a preferred embodiment of the invention, users who view messages posted on server 12 can choose whether they wish to view only messages for which the name of the person posting the message is displayed or whether they are willing to also view messages for which the name of the user who posted the message will not be provided to them.

While the invention has been described above as being embodied in a computer network in which the methods of the invention are carried out, the invention could also be embodied in a computer readable storage medium such as a floppy disc, a CD ROM, a DVD, or some other physical carrier of computer readable instructions upon which is stored computer instructions which, when executed on a computer will cause the computer to operate so as to carry out any method of the invention.

As will be apparent to those skilled in the art in the light of the foregoing disclosure, many alterations and modifications are possible in the practice of this invention without departing from the spirit or scope thereof. While the invention has been described with reference to a system wherein communications between users and a server are mediated by web browsers which communicate with a web server, this is not necessary. Computers 14 could communicate with server 12 using a different protocol than is used for the exchange of web pages. The way in which server 12 stores and retrieves messages and the structure of database 16 can be varied significantly without departing from the invention. There are a multitude of data structures capable of recording associations between a message and a group of reply categories and between a reply and a category. The displays depicted in the figures are by way of illustration only. There are many alternative ways to display replies to messages in a way which allows a user to see how the replies have been categorized. Accordingly, the scope of the invention is to be construed in accordance with the substance defined by the following claims.

What is claimed is:

1. A computer implemented method for managing a discussion, the method comprising, at a computer connected to a communications network:

receiving a first message by way of the communications network;

associating the first message with a group of two or more response categories;

receiving one or more reply messages in response to the first message by way of the communications network, each of the one or more reply messages associated with one of the two or more response categories; and, formatting and forwarding to a user on the communications network a display comprising elements representing the first message and elements representing one or more of the reply messages, the display indicating one of the two or more categories with which each of the one or more reply messages is associated;

wherein the elements representing the reply messages are arranged in columns on the display and each column corresponds to one response category in the group of response categories.

2. The method of claim 1 comprising, associating with each of the first message and the reply messages verification information specifying whether the first message and reply messages are unverifiable or verifiable wherein forwarding the display to the user comprises indicating to the user whether each of the first message and the one or more of the reply messages are verifiable.

3. The method of claim 1 wherein receiving the first message comprises receiving a signal indicating whether or not to make public a name of an author of the first message and wherein forwarding the display to a user comprises forwarding a name of an author of the first message to the user only if the signal indicates that the name of the author of the first message should be made public.

4. The method of claim 1 wherein receiving a first message comprises forwarding a web page comprising a form to a user and receiving data input by the user into the form by way of the communications network.

5. The method of claim 4 wherein the data input by the user comprises a number of categories.

6. The method of claim 4 wherein the data input by the user comprises a descriptive name for each of two or more categories in the group of two or more categories.

7. A computer implemented method according to claim 1 wherein the group of two or more response categories consists of a group selected from the set of groups: FOR, AGAINST;

YES, NO;

TRUE, FALSE;

AGREE, DISAGREE;

YES, MAYBE, NO;

AGREE, DON'T KNOW, DISAGREE;

WORSE, THE SAME, BETTER.

8. A computer implemented method for managing a discussion, the method comprising, at a computer connected to a communications network:

receiving a first message by way of the god communications network;

associating the first message with a group of two or more response categories;

receiving one or more reply messages in response to the first message by way of the communications network, each of the one or more reply messages associated with one of the two or more response categories; and, formatting and forwarding to a user on the communications network a display comprising elements representing the first message and elements representing one or more of the reply messages, the display indicating one of the two or more categories with which each of the one or more reply messages is associated;

wherein the elements associated with the reply messages have a first color for reply messages associated with a first response category in the group of response categories and the elements have a second color for reply messages associated with a second response category in the group of response categories.

9. The method of claim 8 comprising, associating with each of the first message and the reply messages verification information specifying whether the true name of an author of each of the first message and reply messages is unverifiable or verifiable wherein formatting the display comprises selecting for display only reply messages for which the verification information indicates that the true names of the respective authors of those reply messages are verifiable.

10. A computer implemented method according to claim 8 wherein the group of two or more response categories consists of a group selected from the set of groups: FOR, AGAINST;

YES, NO;

TRUE, FALSE;

AGREE, DISAGREE;

YES, MAYBE, NO;

AGREE, DON'T KNOW, DISAGREE;

WORSE, THE SAME, BETTER.

11. A method for retrieving and displaying messages in a discussion group, the method comprising, in a programmed computer:

receiving on a communications network a first message, one or more reply messages in reply to the first message, data specifying two or more response categories and data indicating one of the two or more categories with which each of the reply messages is associated; and, displaying on a display associated with the computer a representation of the first message and representations of a plurality of the reply messages; wherein displaying the representations of each of the plurality of the reply messages comprises visually marking the representation of the reply message so as to indicate the category with which the reply message is associated by displaying the representations of reply messages associated with different categories in different colors and displaying representations of reply messages associated with the same category in the same color.

* * * * *